United States Patent
Schorman et al.

(10) Patent No.: US 7,071,814 B1
(45) Date of Patent: Jul. 4, 2006

(54) CONTEXTUALLY AWARE NETWORK ANNOUNCEMENTS OF PEOPLE

(75) Inventors: Eric R. Schorman, Bedford, TX (US); John D. Reed, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 7 days.

(21) Appl. No.: 09/629,320

(22) Filed: Jul. 31, 2000

(51) Int. Cl.
*H04Q 7/14* (2006.01)

(52) U.S. Cl. .................... 340/7.21; 340/539.1; 455/421
(58) Field of Classification Search ................ 340/7.21, 340/7.22, 7.23, 825.52, 539.11; 370/313, 370/310, 312, 254; 700/11; 455/456, 515, 455/421, 414.1; 342/42; 398/127; 709/204
See application file for complete search history.

(56) References Cited

U.S. PATENT DOCUMENTS

| 4,173,016 A | * | 10/1979 | Dickson ................... 342/42 |
| 4,833,452 A | * | 5/1989 | Currier ................ 340/539.11 |
| 5,119,226 A | * | 6/1992 | Allen et al. ................ 398/127 |
| 5,252,979 A | * | 10/1993 | Nysen ..................... 370/310 |
| 5,412,654 A | * | 5/1995 | Perkins .................... 370/312 |
| 5,459,458 A | * | 10/1995 | Richardson et al. ... 340/825.52 |
| 5,479,408 A | * | 12/1995 | Will ........................ 340/7.21 |
| 5,793,630 A | * | 8/1998 | Theimer et al. ............. 700/11 |
| 5,850,594 A | * | 12/1998 | Cannon et al. ............ 340/7.21 |
| 5,959,543 A | * | 9/1999 | LaPorta et al. ............ 340/7.23 |
| 6,212,548 B1 | * | 4/2001 | DeSimone et al. ......... 709/204 |
| 6,381,465 B1 | * | 4/2002 | Chern et al. ................ 455/466 |
| 6,456,599 B1 | * | 9/2002 | Elliott ........................ 370/254 |
| 6,484,027 B1 | * | 11/2002 | Mauney et al. ............ 455/421 |
| 6,532,368 B1 | * | 3/2003 | Hild et al. .................. 455/515 |
| 6,735,430 B1 | * | 5/2004 | Farley et al. ............ 455/414.1 |

FOREIGN PATENT DOCUMENTS

| WO | WO 97/24627 | * | 7/1997 |
| WO | WO 98/17032 | * | 4/1998 |

* cited by examiner

*Primary Examiner*—Edwin C. Holloway, III
(74) *Attorney, Agent, or Firm*—Hisashi D. Watanabe

(57) ABSTRACT

A context sensitive data announcing device includes an ad hoc network interface configured to receive one or more announcements identifying one or more members of an ad hoc network. The device includes a database which contains information regarding the one or more members of the ad hoc network. A processor is configured to extract the information regarding the one or more members from the database using the identifying announcements. The device includes an output for displaying the information regarding the one or more members.

34 Claims, 3 Drawing Sheets

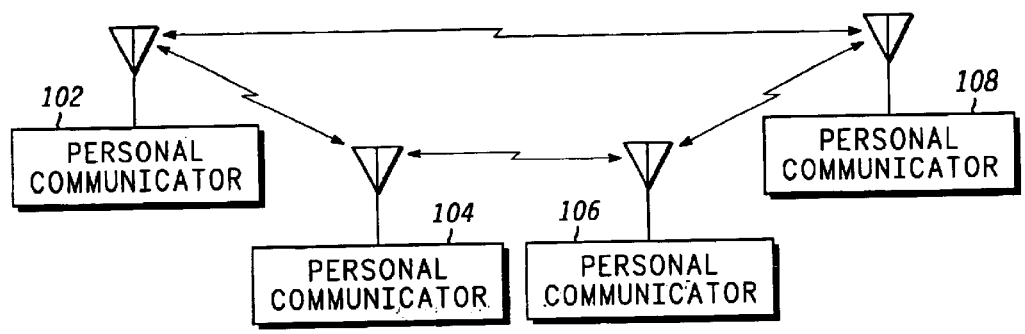
FIG. 1
FIG. 2
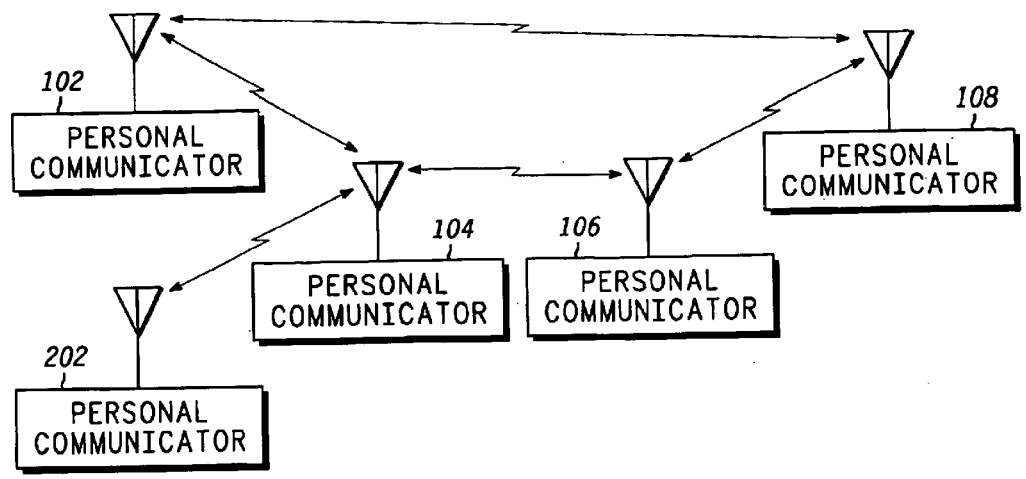

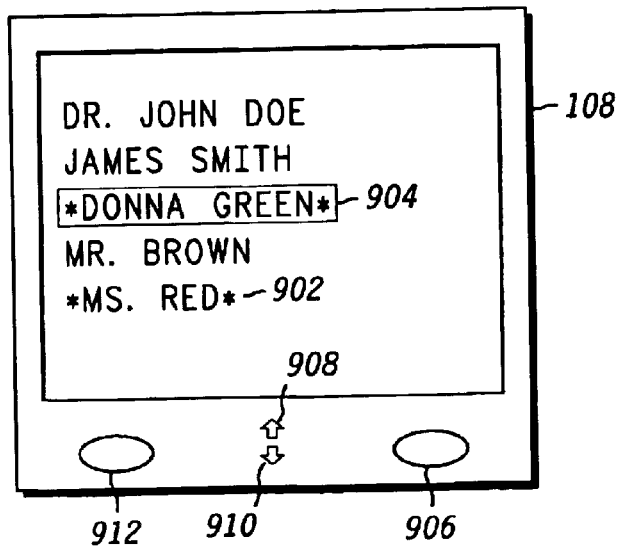

CONTEXTUALLY AWARE NETWORK ANNOUNCEMENTS OF PEOPLE

FIELD OF THE INVENTION

The invention relates generally to a system for making contextually aware network announcements of people. More particularly, the invention relates to an apparatus and method for announcing the presence of a member of an ad hoc network to other members of the ad hoc network.

BACKGROUND OF THE INVENTION

Social or business gatherings are sometimes uncomfortable for people who cannot remember names or other information about people they meet at those gatherings. Personal organizers allow a user to manually access such information through a keyboard or touch screen.

Certain devices, such as cellular telephones, personal digital assistants (PDAs), palm top computers, laptop computers, and other such devices, may have the ability to communicate with each other via a wireless interface. For example, a cellular telephone may have the ability to communicate wirelessly with a laptop computer via a Bluetooth interface or an infrared interface. Such an interface may allow the transmission of data between the cellular telephone and the laptop computer.

BRIEF DESCRIPTION OF THE DRAWINGS

FIG. 1 is a representation of an ad hoc network.

FIG. 2 is a representation of an ad hoc network with a new member.

FIGS. 5–8 are illustrations of a queue.

FIG. 9 is an illustration of a personal communicator showing a queue and devices for selecting items on the queue.

DETAILED DESCRIPTION OF THE PREFERRED EMBODIMENTS

Figure 3:
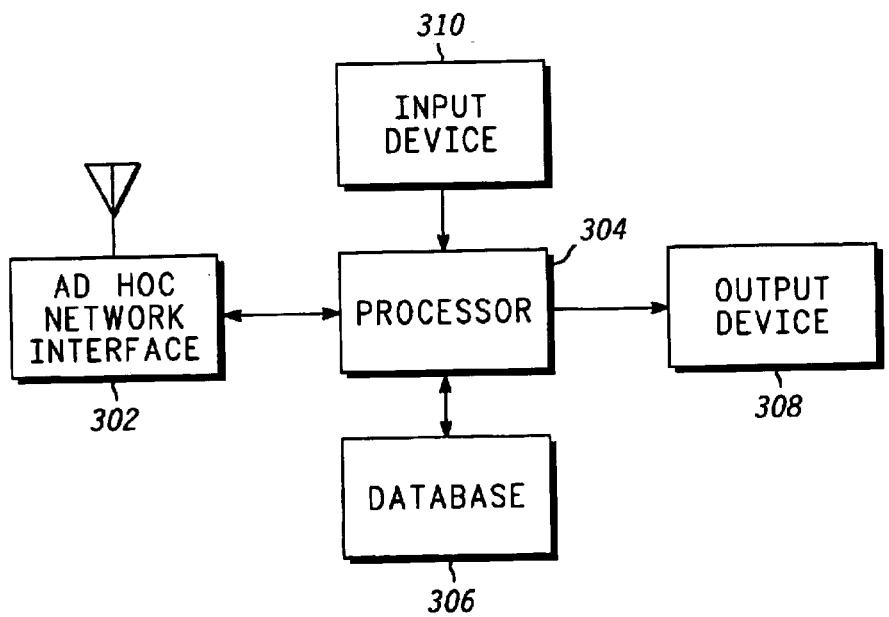
FIG. 3 is a block-diagram of a personal communicator according to the present invention.

Information regarding a person is communicated through an ad hoc network of personal communicators, such as cellular telephones or PDAs, to an announcing personal communicator. The announcing personal communicator accesses a database of information regarding the person to be announced and provides a subset of that information to the user.

Depicted in FIG. 1 is an ad hoc network of personal communicators that provides wireless communications between its members 102, 104, 106 and 108. The wireless communications may be any form of communication that accomplishes the purposes described below, including cellular communications, Bluetooth communications or optical communications. In the ad hoc network illustrated in FIG. 1, personal communicators may move in and out of the network as they move in and out of communications range of each other.

A scenario in which such an ad hoc network might be created is a social gathering, such as a party. At the beginning of the party, for example, only one personal communicator 102 may be present. The personal communicator 102 may be a cellular telephone carried by the host of the party. After the party begins, a guest carrying a personal communicator 104, which may be a PDA, arrives at the party. When the two personal communicators 102 and 104 establish contact with each other, the ad hoc network consists of personal communicator 102 and personal communicator 104. Subsequently, other guests arrive carrying personal communicators 106 and 108. When personal communicators 106 and 108 establish contact with the other personal communicators 102 and 104 and each other, the ad hoc network expands to include those personal communicators 106 and 108. The personal communicators 102, 104, 106 and 108 may transfer information among themselves with or without the intervention of their users.

The information transferred may include the identity of the person carrying the personal communicator. If a new person carrying a personal communicator 202 joins the ad hoc network, as shown in FIG. 2, an identification of the new person will be transmitted from the personal communicator 202 through personal communicators 104 and 106 to personal communicator 108. Any one of communicators 104, 106, or 108 has sufficient information, based on the communication from personal communicator 202, to provide an alert to their respective owners of the presence of the person carrying personal communicator 202. The personal communicator 202 may communicate directly with personal communicators 106 and 108 or through relays as shown in FIG. 2.

Personal communicators 104, 106, and 108 may also announce the presence of the other's owners. For example, personal communicator 108 may also announce the presence of the owners of personal communicators 104 and 106.

Each of the personal communicators may limit its announcements to only those personal communicators within a certain proximity of that personal communicator. Proximity may be determined by measuring the signal strength of the received signal, by measuring the number of "hops" that the signal had to make between the originating personal communicator and the receiving personal communicator, or any other proximity measuring technique. For example, if personal communicator 202 communicates directly with personal communicator 108, personal communicator 108 may measure the signal strength of the signal produced by personal communicator 202 and determine proximity by comparing the measured signal strength to a predetermined threshold.

Alternatively, if the communication between personal communicator 202 and personal communicator 108 is by relay through personal communicators 104 and 106, as shown in FIG. 2, personal communicator 108 may decide that personal communicator 202 is not proximate to personal communicator 108 because of the number of hops that the communication had to make (i.e., from personal communicator 202 to personal communicator 104,.from personal communicator 104 to personal communicator 106, and from personal communicator 106 to personal communicator 108). The number of hops required to make a personal communicator not proximate to another personal communicator may be a variable that could be set globally or within each personal communicator.

To accomplish the functions described above, the personal communicators have the block diagram illustrated in FIG. 3. An ad hoc network interface 302, such as a Bluetooth transceiver, provides an interface between the ad hoc network and a processor 304. The processor 304 may be a processor normally associated with the primary function of the personal communicator. For example, in a cellular telephone, the processor 304 may be associated with the cellular telephone function. Alternatively, the processor may be dedicated to the functions described herein.

The processor 304 is programmed to retrieve communications from the ad hoc network interface 302, which may include communications from other personal communicators that are members of the ad hoc network. Such communications may include the identity of the other members of the ad hoc network. The processor 304 is programmed to retrieve information from a database 306 regarding the member or members identified in the communications. The database 306 may include such information as the relationship of the owner of the receiving personal communicator to the owner of the sending personal communicator, the job title of the owner of the sending personal communicator, the date and time of the most recent or next scheduled meeting between the two parties, assignments from the sending party to the receiving party, or other similar information. The processor 304 sorts the information retrieved from the database 306, and selects portions of it to display on an output device 308. The selections may be based on commands input by the user.

The information may be stored in the database 306 in a variety of ways. A user may input commands and data through an input device 310 to the processor 304, which places the data in a proper format for storage in the database 306. The input device 310 can be a traditional keyboard, a collapsible keyboard, a touch screen, a voice input, or any other device capable of providing information appropriate for storage in the database 306.

Further, the processor 304 may extract data received in communications from other personal communicators and store it in the database 306. For example, a personal communicator that is a member of the network may transmit an communication containing an "electronic business card," which includes basic information about the owner of the transmitting personal communicator, such as name, business affiliation, address, telephone number, email address, etc. If the receiving personal communicator does not already have a record built for that person in database 306, it may build one with the information in the electronic business card. If a record already exists, but the electronic business card contains additional information, the processor 304 may add the additional information to the record in the database 306.

Still more information about the owner of the transmitting personal communicator may be maintained in a database that is external to the receiving personal communicator. In this case, database 306 may be considered a distributed database, in that portions of its data are stored in various physical locations. For example, basic information about a set of people may be maintained in a portion of the database 306 stored on the personal communicator. Still more information about the set of people, or about other people, may be stored on a computer, accessible to the personal communicator wirelessly or through a network, or on another personal communicator accessible via the ad hoc network. When such information is retrieved from the computer or from another personal communicator some or all of it may be stored in the database 306 on the personal communicator.

The communications between the personal communicators may include a link representing an address where additional information regarding the owner of the transmitting personal communicator may be stored. The receiving personal communicator may follow the link to the address, extract some or all of the stored information and store it in the database 306.

Figure 4:
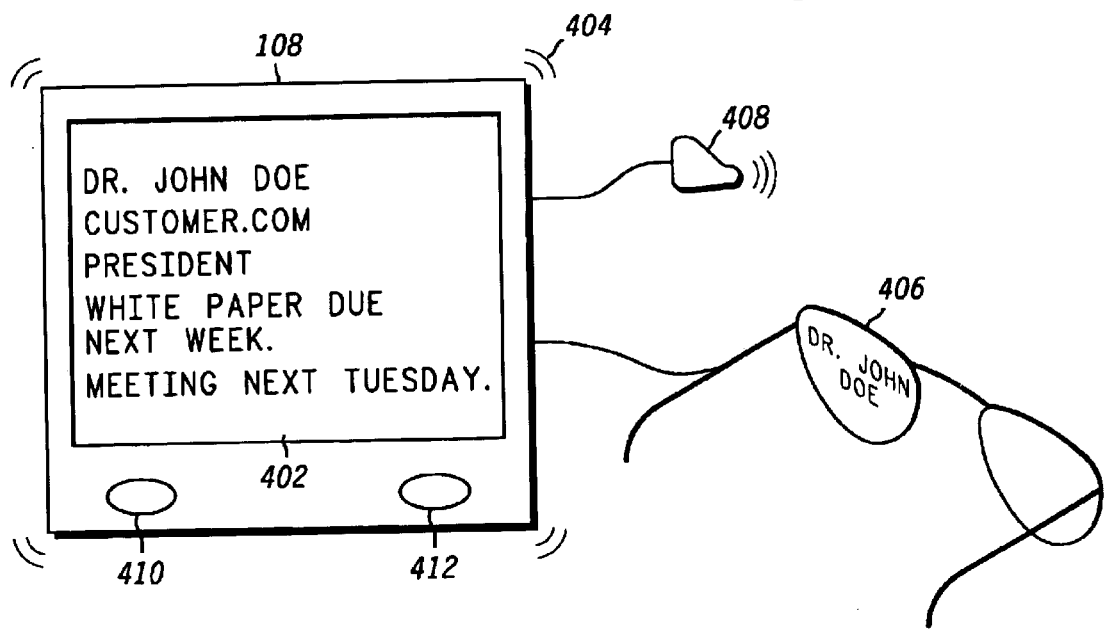
FIG. 4 is a block diagram of a personal communicator according to the present invention, illustrating a variety of output devices.

The output device 308 can take a variety of forms, as illustrated in FIG. 4. The output device 308 may be a display screen 402. In FIG. 4, the display screen is shown displaying information about Dr. John Doe, the president of Customer.com. The owner of the personal communicator illustrated in FIG. 4 has a white paper due to Dr. Doe "next week" and a meeting "next Tuesday." Such a visual display may be accompanied by a vibration of the personal communicator, as indicated by the marks 404 in FIG. 4.

A visual display may be made as a "heads up" display on a pair of glasses 406.

Alternatively, the announcement may be made audibly through an earpiece 408.

The output device 308 could be adapted to provide information to handicapped people. For example, the output device 308 could be a tactile output device for a person who is visually impaired. Further, the announcement can be made through any output device capable of conveying the information retrieved from the database.

The personal communicator illustrated in FIG. 4 also includes two control buttons 410 and 412.

In addition to the information described above, communications between personal communicators may include audio or graphic data, such as photographic images, representations of logos, audio recordings, etc., or links to addresses where such information is stored. The receiving personal communicator may be configured to receive such data and store it in the database 306 and subsequently display it or otherwise announce it on the output device 308.

The database may also contain the date and time when a communication was received from another personal communicator. Such information could be stored in the database 306 along with the proximity information. Location information, derived in a conventional manner (e.g. GPS), could be included in the communication and stored in the database 306. The location information could be for the receiving personal communicator or the transmitting personal communicator.

There may be situations, such as those shown in FIG. 2, in which a personal communicator, such as personal communicator 108, will receive more than one announcement. In such cases, the announcements are placed in a queue, as shown in FIG. 5. FIG. 5 illustrates five announcements queued in the order in which they were received by the announcing personal communicator. The personal communicator reports the announcements in the order in which they are listed in the queue, from top to bottom. Thus, announcement 1 will be announced first, followed by announcement 2, and so on. In FIG. 6, a sixth announcement has been received and added to the bottom of the queue.

The personal communicator also includes the ability to assign priorities to announcements. For example, if an announcement is received from a person to whom, for example, the owner of the announcing personal communicator is obligated or with whom the owner has a special relationship (such as supervisor), the personal communicator may allow that announcement to be placed in the queue somewhere above the bottom. For example, in FIG. 7, announcement 7 has been received and determined to be of sufficient priority that it is added to the top of the queue rather than the bottom.

In some situations, it may be important to list the announcements in the order of proximity to the announcing personal communicator, where proximity is determined using one of the methods described above. Further, it may be desired not to display announcements from personal communicators outside a proximity limit. In FIG. 8, for example, the announcements are listed in order of priority, and in order of proximity to the announcing personal communicator, with some of the announcements being left off the list entirely. Thus, announcement 7 is at the top of the queue because of its priority. Announcement 2 is second because of the proximity of the associated personal communicator to the announcing personal communicator. Announcements 3, 4 and 6 have been left off the queue entirely because of their distance from the announcing personal communicator.

The queue may be shown on the display screen of the personal communicator, as shown in FIG. 9. In this representation, priority announcements are shown with stars 902 to indicate to the user the priority of the announcement. The user can highlight a particular announcement, as indicated by the box 904, and select it to display the associated information, using the select button 906. Cursor control buttons 908 and 910 allow the selection box 904 to be moved. Another button 912 provides additional controls.

After a period of time, the database 306 will contain a record of events associated with the owner of the personal communicator containing the database 306, including, for example, the date and time of a communication, the location of the transmitting personal communicator, the location of the receiving personal communicator, and the determination of proximity between the two personal communicators. The processor 304 would filter the communications in real time and announce on output device 308 only communications from personal communicators meeting priority and proximity requirements, as discussed above. The processor would store in the database 306 all, or some subset, of the received communications for later analysis. Subsequently, the data in the database could be retrieved in time order, or in some other meaningful order, for analysis. A different proximity filter than that applied during real time announcement of data could be applied to the data during later analysis, allowing data not previously reviewed to be examined. Further, the database could be searched for additional information, such as, for example, whether a particular person attended a meeting.

The foregoing describes preferred embodiments of the invention and is given by way of example only. The invention is not limited to any of the specific features described herein, but includes all variations thereof, within the scope of the appended claims.

What is claimed is:

1. A context-sensitive data announcing device comprising
   an ad hoc network interface configured to receive a plurality of announcements identifying a plurality of members of an ad hoc network;
   a database comprising information regarding each of the plurality of members;
   a processor configured to extract the information regarding the plurality of members from the database using the identifying plurality of announcements and to identify members within a certain proximity; and
   a user output device for outputting the information regarding the members identified to be within the certain proximity, the outputted information including an identity and employment information of a person associated with each of the plurality of members.

2. The device of claim 1 wherein the user output device outputs concurrently the information regarding the plurality of members in the order the announcements were received.

3. The device of claim 1 wherein
   the information regarding an urgent member comprises an urgent designation; and
   the user output device outputs concurrently the information regarding the urgent member before information regarding at least some of the other members of the plurality of members.

4. The device of claim 1 wherein the processor is configured to extract the information regarding the plurality of members that are proximate to the device.

5. The device of claim 4 wherein the processor is configured to determine the proximity of the plurality of members using a signal strength provided by the network interface.

6. The device of claim 4 wherein the processor is configured to determine the proximity of a member using the number of hops among members the announcement associated with the member made before being received by the ad hoc network interface.

7. The device of claim 1 wherein the ad hoc network interface uses one of radio frequency communications, optical communications, or wired communications.

8. The device of claim 1 wherein the user output device comprises one of a vibrating mechanism, an audio output, or a visual output.

9. A method for an announcing member of an ad hoc network to announce the presence of one or more members of the ad hoc network, the method comprising
   receiving an identifying announcement from a plurality of members of the ad hoc network;
   accessing a database using the plurality of identifying announcements to retrieve information regarding each of the plurality of member of the ad hoc network from which an announcement was received;
   identifying members within a certain proximity; and
   outputting the information regarding the members identified to be within the certain proximity to a user output device, the outputted information including an identity and employment information of a person associated with each of the plurality of members.

10. The method of claim 9 wherein outputting concurrently the information includes outputting concurrently the information in the order received.

11. The method of claim 9 wherein outputting concurrently the information includes raising an urgent identifying announcement to output above information regarding at least one other member of the plurality of members.

12. The method of claim 9 further comprising
    determining the proximity to the announcing member of each of the members of the ad hoc network from which the announcing member received un announcement; and
    outputting comprises outputting only the identifying data for members of the ad hoc network that are proximate to the announcing member.

13. The method of claim 12 wherein
    the announcements hop among members of the ad hoc network in order to reach the announcing member and wherein
    determining the proximity comprises counting the hops an announcement made before reaching the announcing member.

14. The method claim 12 further comprising
    measuring the signal strength of each received identifying announcement; and wherein determining the proximity comprises comparing the signal strength of each received identifying announcement to a threshold.

15. The method of claim 9 further comprising building the database.

16. The method of claim 15 wherein building the database comprises extracting new information from the plurality of identifying announcements; and storing the new information in the database.

17. The method of claim 15 wherein building the database comprises retrieving new information from a database external to the announcing member; and storing the new information in the database.

18. A system for identifying members of an ad hoc network, the system comprising communicators, associated with a plurality of source members and a display member, for communicating announcements regarding the source members between the source members and the display member, a database comprising information regarding the source members;

a processor configured to access the database using the announcements to produce accessed information and to identify members within a certain proximity; and an output associated with the display member for outputting the accessed information regarding the source members identified to be within the certain proximity, the accessed information including an identity and employment information of a person associated with each source member.

19. The system of claim 18 wherein the processor it configured to access the database for only those source members that are proximate to the display member.

20. The system of claim 19 wherein an announcement passes through at least one communicators as it travels from the source members to the display member; and the processor is configured to determine the proximity of a source member to the display member based on the number of communicators the announcement passed through between the source member and the display member.

21. The system of claim 19 further comprising a plurality of signals for carrying the announcements between the source members and the display member;

a signal strength measurer associated with the display member, the signal strength measurer producing a signal strength for each signal received from a source member, and wherein the processor is configured to determine the proximity of the source members to the display member using the respective signal strengths.

22. The system of claim 18 wherein the output displays the accessed information for the source members in the order that the announcements were received from the respective source members.

23. The system of claim 18 wherein the accessed information for each source member has an associated urgency, the urgency having an order; and the output displays the accessed information for the source members in the order of urgency.

24. The system of claim 18 wherein the processor is associated with the display member.

25. The system of claim 18 wherein the database is associated with the display member.

26. The device of claim 1 wherein the user output device outputs concurrently the information regarding the plurality of members in order of proximity to the announcing device.

27. The method of claim 9 wherein outputting concurrently the information includes outputting concurrently the information in order of proximity to the announcing member.

28. The system of claim 18 wherein the output associated with the display member outputs concurrently the accessed information regarding the plurality of members in order of proximity to the display member.

29. The device of claim 1, wherein the employment information includes at least one of an entity name and a job title of the person associated with each of the plurality of members.

30. The device of claim 1, wherein the outputted information further includes at least one of scheduled meeting information and assignment information associated with at least two members of the plurality of members.

31. The method of claim 9, wherein the employment information includes at least one of an entity name and a job title of the person associated with each of the plurality of members.

32. The method of claim 9, wherein the outputted information further includes at least one of scheduled meeting information and assignment information associated with at least two members of the plurality of members.

33. The system of claim 18, wherein the employment information includes at least one of an entity name and a job title of the person associated with each of the plurality of members.

34. The system of claim 18, wherein the accessed information further includes at least one of scheduled meeting information and assignment information associated with at least two members of the plurality of members.

* * * * *